(12) United States Patent
Elshafie et al.

(10) Patent No.: US 11,877,173 B2
(45) Date of Patent: Jan. 16, 2024

(54) OPTIMIZATION OF CHANNEL QUALITY INDICATOR (CQI) FEEDBACK FOR MULTIPLE COMPONENT CARRIERS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/303,045

(22) Filed: May 19, 2021

(65) Prior Publication Data
US 2021/0368375 A1 Nov. 25, 2021

Related U.S. Application Data

(60) Provisional application No. 63/027,621, filed on May 20, 2020.

(51) Int. Cl.
*H04W 24/10* (2009.01)
*H04W 72/1268* (2023.01)
*H04W 72/23* (2023.01)

(52) U.S. Cl.
CPC ....... *H04W 24/10* (2013.01); *H04W 72/1268* (2013.01); *H04W 72/23* (2023.01)

(58) Field of Classification Search
None
See application file for complete search history.

(56) References Cited

U.S. PATENT DOCUMENTS

| 8,014,455 B2 * | 9/2011 | Kim | H04L 1/0029 |
| | | | 375/260 |
| 2009/0060010 A1 * | 3/2009 | Maheshwari | H04L 1/1671 |
| | | | 455/67.11 |

(Continued)

OTHER PUBLICATIONS

Huawei, et al., "Simultaneous CQI and A/N with the Baseline of No. Carrier-Domain A/N Bundling," 3GPP Draft, 3GPP TSG RAN WG1 Meeting #63bis, R1-110011, 3rd Generation Partnership Project (3GPP), Mobile Competence Centre, 650, Route Des Lucioles, F-06921, Sophia-Antipolis Cedex, France, vol. RAN WG1. No. Dublin, Ireland, Jan. 17, 2011-Jan. 21, 2011, Jan. 1, 2011 (Jan. 1, 2011), XP050489997, 6 pages, [retrieved on Jan. 1, 2011] Section 2.2.

(Continued)

*Primary Examiner* — Ajit Patel
*Assistant Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a plurality of communications on a plurality of component carriers. The UE may transmit, to the base station, uplink control information that includes a first portion that indicates respective feedback for the plurality of communications, and a second portion that indicates an average channel quality indicator (CQI) value and respective differential values, relative to the average CQI value, for multiple communications, of the plurality of communications, for which negative acknowledgment feedback is transmitted. Numerous other aspects are provided.

30 Claims, 6 Drawing Sheets

(56) References Cited

U.S. PATENT DOCUMENTS

| | | | | |
|---|---|---|---|---|
| 2010/0271970 A1* | 10/2010 | Pan | ................ | H04L 1/0026 370/252 |
| 2011/0249578 A1* | 10/2011 | Nayeb Nazar | ........ | H04L 5/0053 370/252 |
| 2011/0312332 A1* | 12/2011 | Choudhury | ........... | H04L 1/0029 455/452.2 |
| 2012/0327875 A1* | 12/2012 | Han | ................ | H04L 27/2633 370/329 |
| 2013/0039197 A1* | 2/2013 | Pan | ................ | H04L 1/0026 370/252 |
| 2013/0230033 A1* | 9/2013 | Lee | ................ | H04L 5/0055 370/336 |
| 2019/0280806 A1* | 9/2019 | Baldemair | ............ | H04L 1/1854 |
| 2020/0136763 A1 | 4/2020 | Lee et al. | | |

OTHER PUBLICATIONS

International Search Report and Written Opinion—PCT/US2021/070587—ISA/EPO—dated Sep. 3, 2021.
Sharp: "Periodic CQI Reporting for Multiple Component Carriers," 3GPP Draft, 3GPP TSG-RAN WG1#61 bis, R1-103718, 3rd Generation Partnership Project (3GPP), Mobile Competence Centre, 650, Route Des Lucioles, F-06921, Sophia-Antipolis Cedex, France, vol. RAN WG1. No. Dresden, Germany, Jun. 28, 2010-Jul. 2, 2010, Jun. 22, 2010 (Jun. 22, 2010), XP050449149, 3 pages, [retrieved on Jun. 22, 2010] the whole document.

* cited by examiner

OPTIMIZATION OF CHANNEL QUALITY INDICATOR (CQI) FEEDBACK FOR MULTIPLE COMPONENT CARRIERS

CROSS-REFERENCE TO RELATED APPLICATION

This Patent application claims priority to U.S. Provisional Patent Application No. 63/027,621, filed on May 20, 2020, entitled "OPTIMIZATION OF CHANNEL QUALITY INDICATOR (CQI) FEEDBACK FOR MULTIPLE COMPONENT CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for optimization of channel quality indicator (CQI) feedback for multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a plurality of communications on a plurality of component carriers; and transmitting, to the base station, uplink control information that includes a first portion that indicates respective feedback for the plurality of communications, and a second portion that indicates an average channel quality indicator (CQI) value and respective differential values, relative to the average CQI value, for multiple communications, of the plurality of communications, for which negative acknowledgment feedback is transmitted.

In some aspects, a method of wireless communication, performed by a base station, may include transmitting, to a UE, a plurality of communications on a plurality of component carriers; and receiving, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received.

In some aspects, a UE for wireless communication may include a memory and one or more processors coupled to the memory. The memory and the one or more processors may be configured to receive, from a base station, a plurality of communications on a plurality of component carriers; and transmit, to the base station, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted.

In some aspects, a base station for wireless communication may include a memory and one or more processors coupled to the memory. The memory and the one or more processors may be configured to transmit, to a UE, a plurality of communications on a plurality of component carriers; and receive, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received.

In some aspects, a non-transitory computer-readable medium may store one or more instructions for wireless communication. The one or more instructions, when executed by one or more processors of a UE, may cause the one or more processors to receive, from a base station, a plurality of communications on a plurality of component carriers; and transmit, to the base station, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted.

In some aspects, a non-transitory computer-readable medium may store one or more instructions for wireless communication. The one or more instructions, when executed by one or more processors of a base station, may cause the one or more processors to transmit, to a UE, a plurality of communications on a plurality of component carriers; and receive, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received.

In some aspects, an apparatus for wireless communication may include means for receiving, from a base station, a plurality of communications on a plurality of component carriers; and means for transmitting, to the base station, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted.

In some aspects, an apparatus for wireless communication may include means for transmitting, to a UE, a plurality of communications on a plurality of component carriers; and means for receiving, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
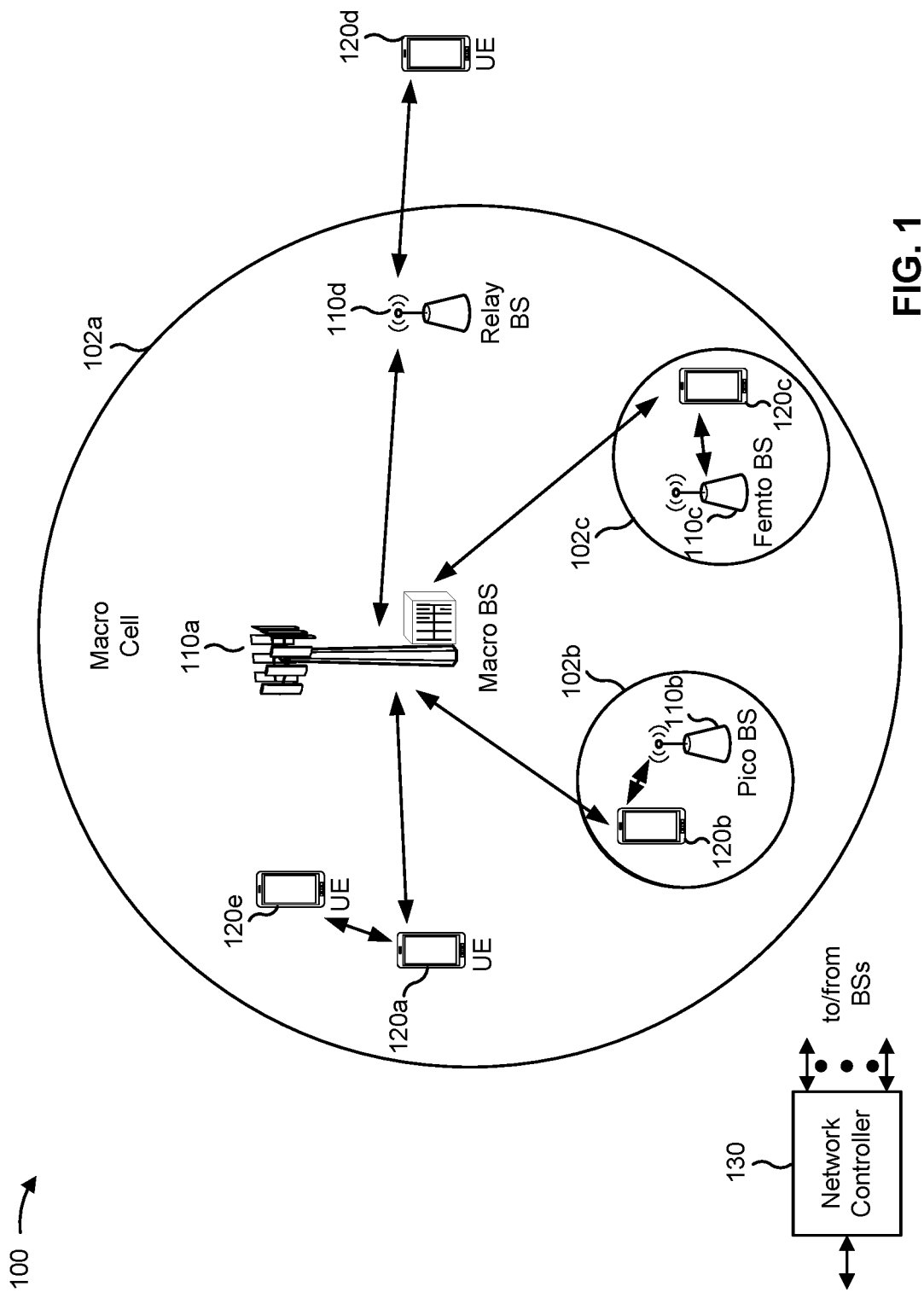
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
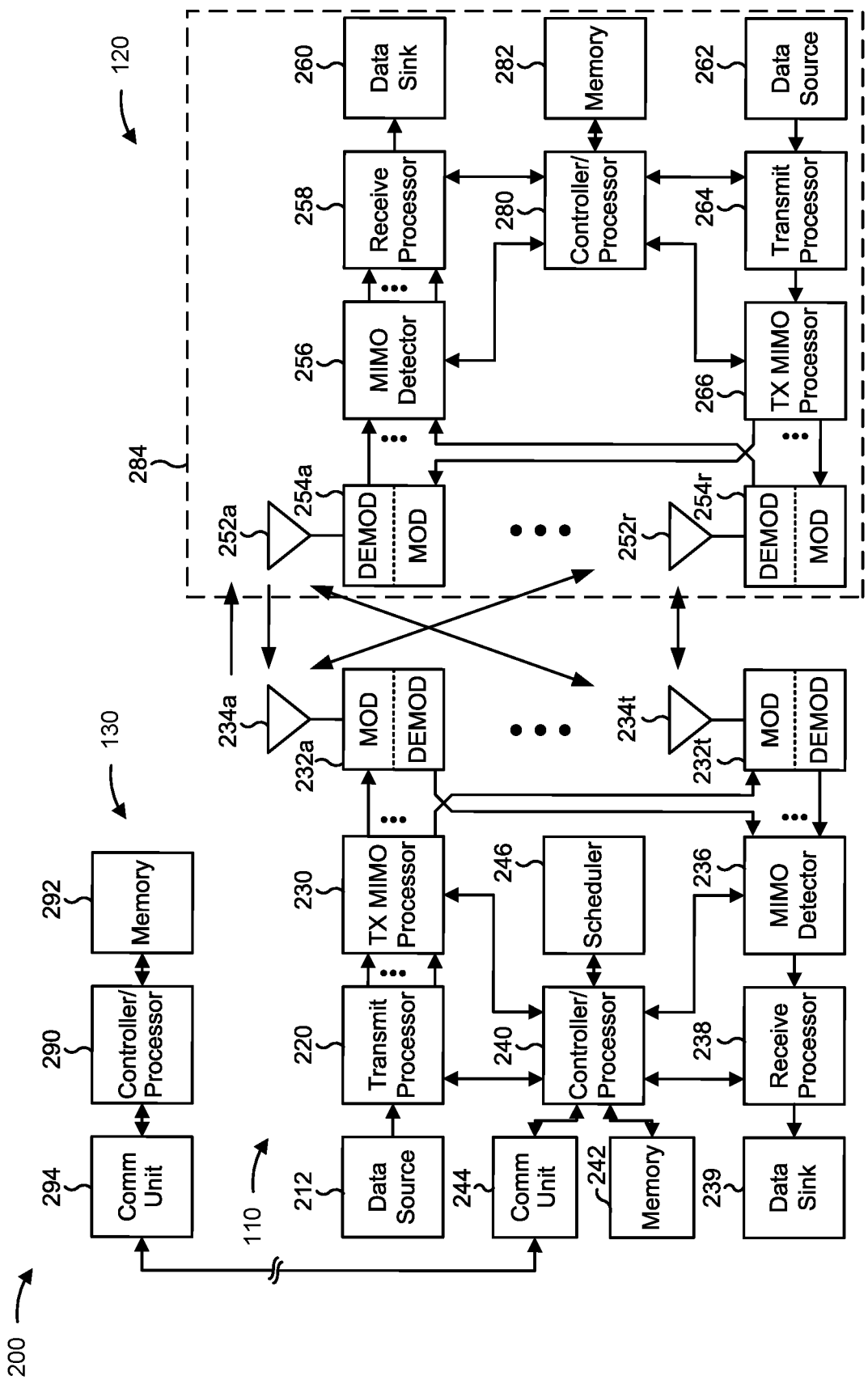
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with optimization of CQI feedback for multiple component carriers, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for receiving a plurality of communications on a plurality of component carriers, means for transmitting uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a plurality of communications on a plurality of component carriers, means for receiving uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
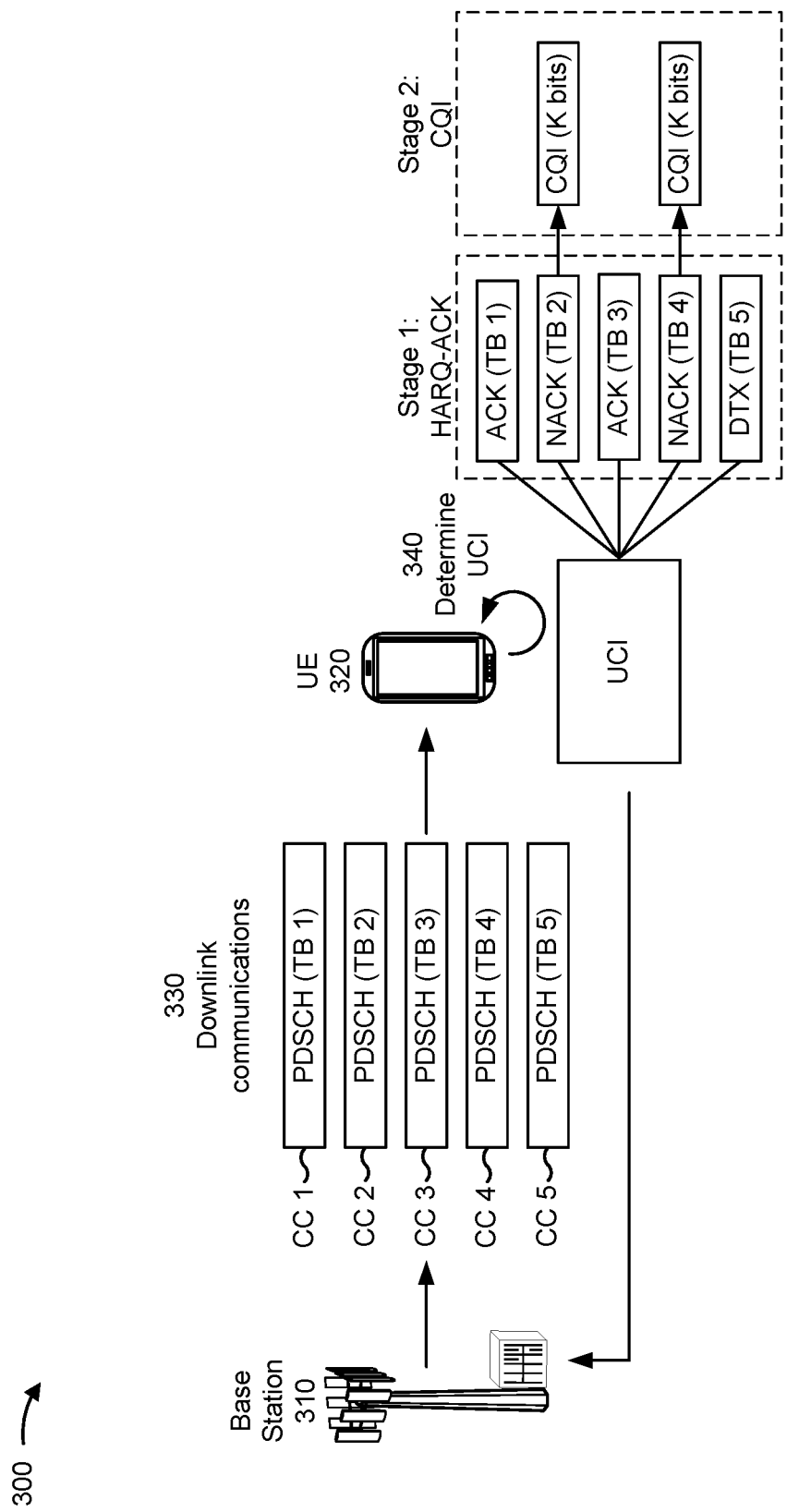
FIG. 3 is a diagram illustrating an example of turbo-hybrid automatic repeat request (turbo-HARQ) feedback for multiple component carriers, in accordance with the present disclosure.

FIG. 3 is a diagram illustrating an example 300 of turbo-HARQ feedback for multiple component carriers, in accordance with the present disclosure. As shown in FIG. 3, a base station 310 and a UE 320 may communicate with one another.

5G/NR may provide for ultra-reliable low latency communication (URLLC). URLLC imposes stringent packet error rate (PER) requirements (e.g., 1e-4 to 1e-6) with low latency (e.g., 0.5 milliseconds (ms) to 10 ms). Accordingly, a HARQ procedure, such as a turbo-HARQ procedure (which also may be referred to as a URLLC HARQ procedure), may be used to achieve URLLC reliability requirements. Due to the low latency requirements, the number of HARQ retransmissions that can be used is limited (e.g., to a maximum of 2 retransmissions).

According to the HARQ procedure, a base station may transmit a communication (e.g., using a first MCS, which may be determined according to periodic CSI reporting, and according to a first target block error rate (BLER), such as 1e-1) to a UE. The UE may attempt to decode the communication, and if decoding is unsuccessful, the UE may determine an MCS that is needed for decoding the communication. For example, UE 120 may calculate an accumulated capacity based at least in part on a signal to interference plus noise ratio (SINR) of the communication and determine a difference between the accumulated capacity and a target capacity of the communication. The UE may transmit uplink control information (UCI) that indicates negative acknowledgment (NACK) feedback for the communication (e.g., due to unsuccessful decoding of the communication) and channel state information (CSI) feedback (e.g., asynchronous CSI reporting). The CSI feedback may include information that enables the base station to determine the MCS that is needed for decoding of the communication at the UE.

Based at least in part on receiving the NACK feedback, the base station may transmit a retransmission of the communication (e.g., using a second MCS, which may be determined based at least in part on the CSI feedback, and according to a second target BLER, such as 1e-4). For example, the base station may determine an MCS, a coding length, a resource allocation, a beam, and/or the like, for the retransmission based at least in part on the CSI feedback. This may enable successful decoding of the retransmission at the UE, thereby achieving ultra-reliability for the retransmission and less latency.

As shown in FIG. 3, the base station 310 and the UE 320 may communicate, according to the HARQ procedure described above, using a plurality of component carriers (CCs). For example, as shown by reference number 330, the base station 310 may transmit a plurality of communications (shown as transport blocks TB 1-TB 5) in respective physical downlink shared channels (PDSCHs) on a plurality of CCs (shown as CC 1-CC 5) to the UE 320. As shown by reference number 340, the UE 320 may determine UCI for the plurality of communications. For example, the UE 320 may determine respective acknowledgment (ACK) or NACK feedback (ACK/NACK feedback) for the plurality of communications. In some cases, the UE 320 may determine that a downlink control information (DCI) misdetection (DTX) indication is to be reported for one or more of the plurality of communications.

As shown in FIG. 3, a first portion (Stage 1) of the UCI may indicate respective ACK/NACK feedback (e.g., HARQ-ACK feedback) for the plurality of communications, and a second portion (Stage 2) of the UCI may indicate respective CSI, such as respective channel quality indicators (CQIs), for the CC(s) of the communication(s) associated with NACK feedback in the first portion of the UCI. As shown, each CQI may be allocated K bits (e.g., K=4) of the UCI. Accordingly, CQI reporting for multiple CCs may cause excessive overhead, and consume significant network resources, UE resources, base station resources, and/or the like.

Some techniques and apparatuses described herein provide compression of turbo-HARQ feedback (e.g., two-stage UCI), thereby conserving network resources, UE resources, base station resources, and/or the like. In particular, some techniques and apparatuses described herein enable a UE to use a reduced quantity of bits for reporting CSI feedback for multiple CCs in two-stage UCI. For example, the UE may report an average CQI across multiple CCs, and report differential values, relative to the average CQI, for CCs associated with NACK feedback. In this way, a quantity of bits used for reporting CSI in two-stage UCI may be reduced.

As indicated above, FIG. 3 is provided as an example. Other examples may differ from what is described with respect to FIG. 3.

Figure 4:
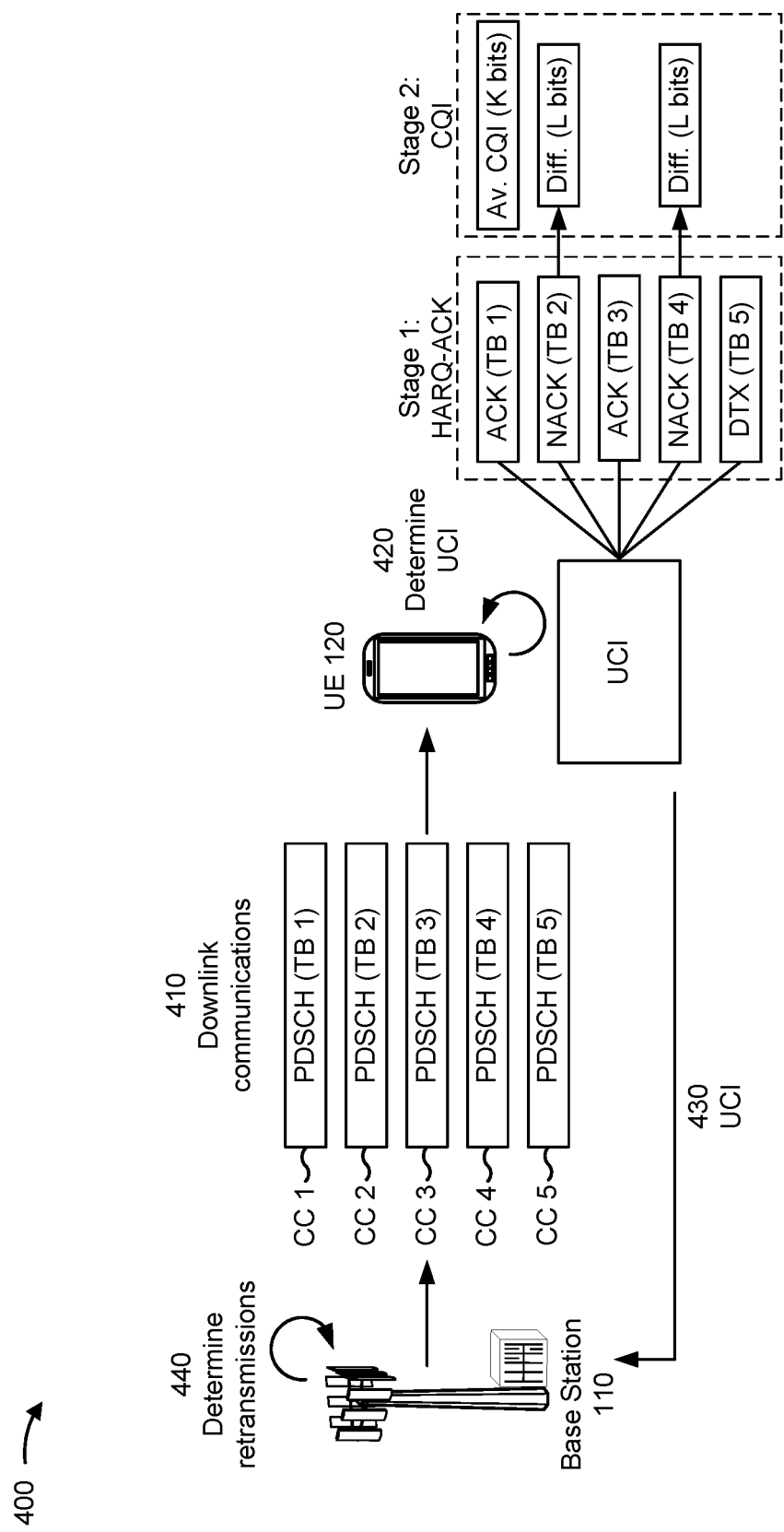
FIG. 4 is a diagram illustrating an example associated with optimization of channel quality indicator (CQI) feedback for multiple component carriers, in accordance with the present disclosure.

FIG. 4 is a diagram illustrating an example 400 associated with optimization of CQI feedback for multiple component carriers, in accordance with the present disclosure. As shown in FIG. 4, a base station 110 and a UE 120 may communicate with one another. In some aspects, the base station 110 may correspond to the base station 310, and the UE 120 may correspond to the UE 320, described above. In some aspects, the base station 110 and the UE 120 may communicate using carrier aggregation. Using carrier aggregation, the base station 110 and the UE 120 may communicate with one another using a primary cell (PCell) and one or more secondary cells (SCells).

Carrier aggregation may generally enable two or more CCs (sometimes referred to as carriers) to be combined (e.g., into a single channel) for a single UE to enhance data capacity. In general, CCs can be combined in the same or different frequency bands, the same or different frequency ranges, and/or the like. Additionally, or alternatively, contiguous or non-contiguous CCs can be combined. In some aspects, the base station 110 may configure carrier aggregation for the UE 120 in an intra-band contiguous mode, where the aggregated CCs are contiguous to one another and are in the same frequency band. Additionally, or alternatively, carrier aggregation may be configured in an intra-band non-contiguous mode, where the aggregated CCs are in the same frequency band and are non-contiguous to one another. Additionally, or alternatively, carrier aggregation may be configured in an inter-band non-contiguous mode, where the aggregated CCs are non-contiguous to one another and are in different frequency bands.

As shown in FIG. 4, and by reference number 410, the base station 110 may transmit, and the UE 120 may receive, a plurality of communications (shown as TB 1-TB 5) in respective physical downlink shared channels (PDSCHs) on a plurality of CCs (shown as CC 1-CC 5). That is, the base station 110 may transmit a communication, of the plurality of communications, on a CC of the plurality of CCs. As described above, the plurality of CCs may be associated with communication between the base station 110 and the UE 120 that uses carrier aggregation.

As shown by reference number 420, the UE 120 may determine UCI for the plurality of communications. The UCI may be two-stage UCI, such as turbo-HARQ feedback used for URLLC. For example, the UCI may include a first portion (Stage 1) that indicates respective ACK/NACK feedback (e.g., HARQ-ACK feedback) for the plurality of communications, and a second portion (Stage 2) that indicates CSI for one or more CCs associated with NACK feedback. In some aspects, the ACK/NACK feedback may indicate ACK feedback for a communication (e.g., if decoding of the communication at the UE 120 is successful), NACK feedback for a communication (e.g., if decoding of the communication at the UE 120 is unsuccessful), or a DTX indication for a communication (e.g., if the UE 120 misdetected the DCI scheduling the communication).

As described above, the second portion of the UCI may indicate CSI for one or more CCs associated with NACK feedback (e.g., in the first portion of the UCI). For example, due to unsuccessful decoding, the UE 120 may determine NACK feedback for multiple communications of the plurality of communications (referred to herein as failed communications). Continuing with the previous example, the UE 120 may determine CSI for the CCs on which the failed communications are received by the UE 120 (referred to herein as failed CCs).

In some aspects, CSI included in the second portion (Stage 2) of the UCI may indicate one or more CQI values. In some aspects, the second portion of the UCI may indicate an average CQI value for the failed CCs. In some aspects, the second portion of the UCI may indicate (e.g., instead of an average CQI value) another aggregate CQI value for the failed CCs, another combination of CQI values for the failed CCs, and/or the like. The average CQI value may use a quantity of bits K (e.g., K=4) of the UCI. The quantity of bits K that is to be used by the UE 120 may be indicated to the UE 120, configured for the UE 120, or otherwise provisioned to the UE 120.

In some aspects, the UE 120 may determine respective spectral efficiency values for the failed CCs, determine respective CQI values for the failed CCs according to a mapping of spectral efficiency values to CQI values, and determine the average CQI value by calculating an average of the respective CQI values for the failed CCs (the average CQI value may be rounded to a CQI value of the mapping). In some aspects, the UE 120 may determine respective spectral efficiency values for the failed CCs, calculate an average of the respective spectral efficiency values, and determine the average CQI value using the average spectral efficiency value according to the mapping (the average spectral efficiency value may be rounded to a CQI value of the mapping). In some aspects, the UE 120 may determine a CQI value for a failed CC based at least in part on log likelihood ratio (LLR) values, a demodulation reference signal (DMRS), and/or the like.

In some aspects, the UE 120 may use less than the quantity of bits K to indicate the average CQI value. For example, instead of signaling ACK feedback, NACK feedback, or a DTX indication for a communication in the first portion of the UCI, the UE 120 may use an indicator (e.g., a combination of two bits) to indicate ACK feedback, NACK feedback, or a DTX indication for the communication. The indicator may also indicate a bit (e.g., a most significant bit (MSB) or a least significant bit (LSB)) of the average CQI value. For example, a first indicator may indicate DTX, a second indicator may indicate ACK feedback, a third indicator may indicate NACK feedback and a first value for a bit (e.g., an MSB or an LSB) of the average CQI value, and a fourth indicator may indicate NACK feedback and a second value for the bit of the average CQI value. In some aspects, the first, second, third, and fourth indicators may be in accordance with Table 1:

TABLE 1

| Indicator (bit 1 bit 2) | Indication |
|---|---|
| (00) | DTX |
| (01) | ACK |
| (10) | NACK + 0 value for bit of the average CQI value |
| (11) | NACK + 1 value for bit of the average CQI value |

In some aspects, the second portion of the UCI may indicate respective differential values for the failed CCs relative to the average CQI value. A differential value may use a quantity of bits L (e.g., L=1, 2, or 3) of the UCI. The quantity of bits L may be less than the quantity of bits K (e.g., K=4) used for the average CQI value (e.g., L≤K−1). In this way, the CQI reporting described herein is compressed relative to CQI reporting that uses K bits for reporting each CQI value. In some aspects, the base station 110 may transmit, and the UE 120 may receive, an indication (e.g., in a numBitsPerCC parameter) of the quantity of bits L that is to be used by the UE 120 for reporting a differential value. The base station 110 may transmit an initial indication of the quantity of bits L via radio resource control (RRC) signaling or a medium access control (MAC) control element (MAC-CE), and the base station 110 may transmit an updated indication of the quantity of bits L in DCI.

In some aspects, the UE 120 may determine a difference between the average CQI value and a CQI value for a failed CC (referred to as a CQI offset value). For example, the UE 120 may subtract the CQI value for the failed CC from the average CQI value to determine the difference. The UE 120 may quantize the determined difference according to a mapping. For example, the UE 120 may use the mapping to determine a differential value indicator for a failed CC based at least in part on the CQI offset value for the failed CC. The UE 120 may use a differential value indicator to indicate a differential value in the UCI.

In some aspects, the mapping that the UE 120 uses to determine a differential value indicator may be based at least in part on the quantity of bits L that is indicated to the UE 120. For example, as shown by Tables 2-4, the UE 120 may use a first mapping if L=1, a second mapping if L=2, and a third mapping if L=3:

TABLE 2

(Mapping for L = 1)

| Differential Value | CQI Offset Value |
|---|---|
| 0 | ≤0 |
| 1 | ≥1 |

TABLE 3

(Mapping for L = 2)

| Differential Value | CQI Offset Value |
|---|---|
| 0 | 0 |
| 1 | ≥1 |
| 2 | −1 |
| 3 | ≤−2 |

TABLE 4

(Mapping for L = 3)

| Differential Value | CQI Offset Value |
|---|---|
| 0 | 0 |
| 1 | 1 |
| 2 | 2 |
| 3 | ≥3 |
| 4 | ≤−4 |
| 5 | −1 |
| 6 | −2 |
| 7 | −3 |

By reporting a differential value indicator in the UCI, rather than a CQI value, the UE 120 may reduce a size of the UCI by one or more bits. For example, if the quantity of bits K is 4, the quantity of bits L is 1, 2, or 3, and a quantity of failed communications is 3, then a total quantity of bits of the UCI using the compression described herein is K+3L and a total quantity of bits of the UCI without using the compression described herein is 3K. Thus, a size of the UCI, by using the compression described herein, is reduced by 5 bits if L is 1 or reduced by 2 bits if L is 2. As another example, if the quantity of bits K is 4, the quantity of bits L is 1, 2, or 3, and a quantity of failed communications is 4, then a total quantity of bits of the UCI using the compression described herein is K+4L and a total quantity of bits of the UCI without using the compression described herein is 4K. Thus, a size of the UCI, by using the compression described herein, is reduced by 8 bits if L is 1 or reduced by 4 bits if L is 2.

As a further example, if the quantity of bits K is 4, the quantity of bits L is 1, 2, or 3, and a quantity of failed communications is 5, then a total quantity of bits of the UCI using the compression described herein is K+5L and a total quantity of bits of the UCI without using the compression described herein is 5K. Thus, a size of the UCI, by using the compression described herein, is reduced by 11 bits if L is 1, reduced by 6 bits if L is 2, or reduced by 1 bit if L is 3. As an additional example, if the quantity of bits K is 4, the quantity of bits L is 1, 2, or 3, and a quantity of failed communications is 6, then a total quantity of bits of the UCI using the compression described herein is K+6L and a total quantity of bits of the UCI without using the compression described herein is 6K. Thus, a size of the UCI, by using the compression described herein, is reduced by 14 bits if L is 1, reduced by 8 bits if L is 2, or reduced by 2 bits if L is 3.

As demonstrated by the examples above, in some cases, a particular combination of a value for the quantity of bits L and a quantity of failed communications may not result in a reduction of the size of the UCI. In such cases, the UE 120 may determine that a quantity of bits L', different from the quantity of bits L indicated to the UE 120, is to be used. For example, the UE 120 may determine that the different quantity of bits L' is to be used based at least in part on a quantity of the failed communications. As an example, the UE 120 may determine that the different quantity of bits L' is to be used in accordance with Table 5 (e.g., if K=4):

TABLE 5

| Quantity of Failed Communications | Different Quantity of Bits L' |
|---|---|
| 1 | Use K = 4 bits to transmit CQI value instead of differential value |
| 2 | L' = 1 |
| 3, 4 | L' ≤ 2 |
| ≥5 | L' ≤ 3 |

In some aspects, the base station 110 may transmit, and the UE 120 may receive, information that identifies the different quantity of bits L' that is to be used by the UE 120. For example, the information may indicate a default quantity of bits L' (e.g., L'=1) that the UE 120 is to use (e.g., if the UE 120 determines that the indicated quantity of bits L does not result in a reduction of the size of the UCI). As another example, the information, such as a table, may indicate a particular quantity of bits L' that the UE 120 is to use for a particular quantity of failed communications (e.g., if the UE 120 determines that the indicated quantity of bits L does not result in a reduction of the size of the UCI). In some aspects, the UE 120 may be configured, or otherwise provisioned, with the information that identifies the different quantity of bits L' (e.g., the default quantity of bits or the table).

As shown by reference number 430, the UE 120 may transmit (e.g., in a physical uplink control channel (PUCCH)), and the base station 110 may receive, the UCI. As shown by reference number 440, the base station 110 may determine whether to transmit retransmissions, of one or more of the plurality of communications, based at least in part on the UCI. For example, the base station 110 may determine to transmit retransmissions for the failed communications (e.g., for each communication for which the UE 120 indicated NACK feedback in the UCI).

In some aspects, the base station 110 may determine respective transmission parameters for the retransmissions. The base station 110 may determine the respective transmission parameters for the retransmissions based at least in part on the average CQI value and the differential value indicators in the UCI. For example, the base station 110 may use a differential value indicator of the UCI to determine a CQI offset value (e.g., using a mapping described above), and may apply the CQI offset value to the average CQI value (e.g., subtract the CQI offset value from the average CQI value) to determine a CQI value for a failed CC. Accordingly, the base station 110 may determine transmission parameters for the retransmission, on the failed CC, based at least in part on the determined CQI value. For example, the base station 110 may determine a new MCS (e.g., a modulation order and/or a code rate) for the retransmission based at least in part on the CQI value. In addition, the base station 110 may determine a time and frequency resource allocation for the retransmission (e.g., based at least in part on the UCI), and the base station 110 may schedule the retransmission, on the failed CC, according to the time and frequency resource allocation.

The base station 110 may transmit, and the UE 120 may receive, the retransmissions, on respective CCs, using respective MCSs determined for the retransmissions, as described above. For example, the base station 110 may transmit a retransmission of a communication (e.g., using a new MCS) on a same CC on which the base station 110 originally transmitted the communication. In this way, performance of the retransmissions may be improved, to thereby meet URLLC reliability requirements and/or latency requirements.

In some aspects, the UE 120 may report MCS values in the UCI, in a similar manner as described above. For example, an MCS value may provide an indication of a channel quality. In some aspects, the second portion of the UCI may indicate an average MCS value (e.g., an average of estimated MCS values) for the failed CCs, and the second portion of the UCI may indicate respective differential values for the failed CCs relative to the average MCS value (e.g., indicating respective MCS values for the failed CCs), in a similar manner as described above. In some aspects, the second portion of the UCI may indicate an average MCS difference value for the failed CCs, and the second portion of the UCI may indicate respective differential values for the failed CCs relative to the average MCS difference value (e.g., indicating respective MCS difference values for the failed CCs), in a similar manner as described above. An MCS difference value for a failed CC may correspond to a difference between an MCS value that was estimated by the UE 120 for the failed CC (e.g., based at least in part on an SINR determined by the UE 120 for the failed CC) and an MCS value that was scheduled for a transport block on the failed CC. For example, the MCS difference value may be the estimated MCS value minus the scheduled MCS value, or the MCS difference value may be the scheduled MCS value minus the estimated MCS value.

As indicated above, FIG. 4 is provided as an example. Other examples may differ from what is described with respect to FIG. 4.

Figure 5:
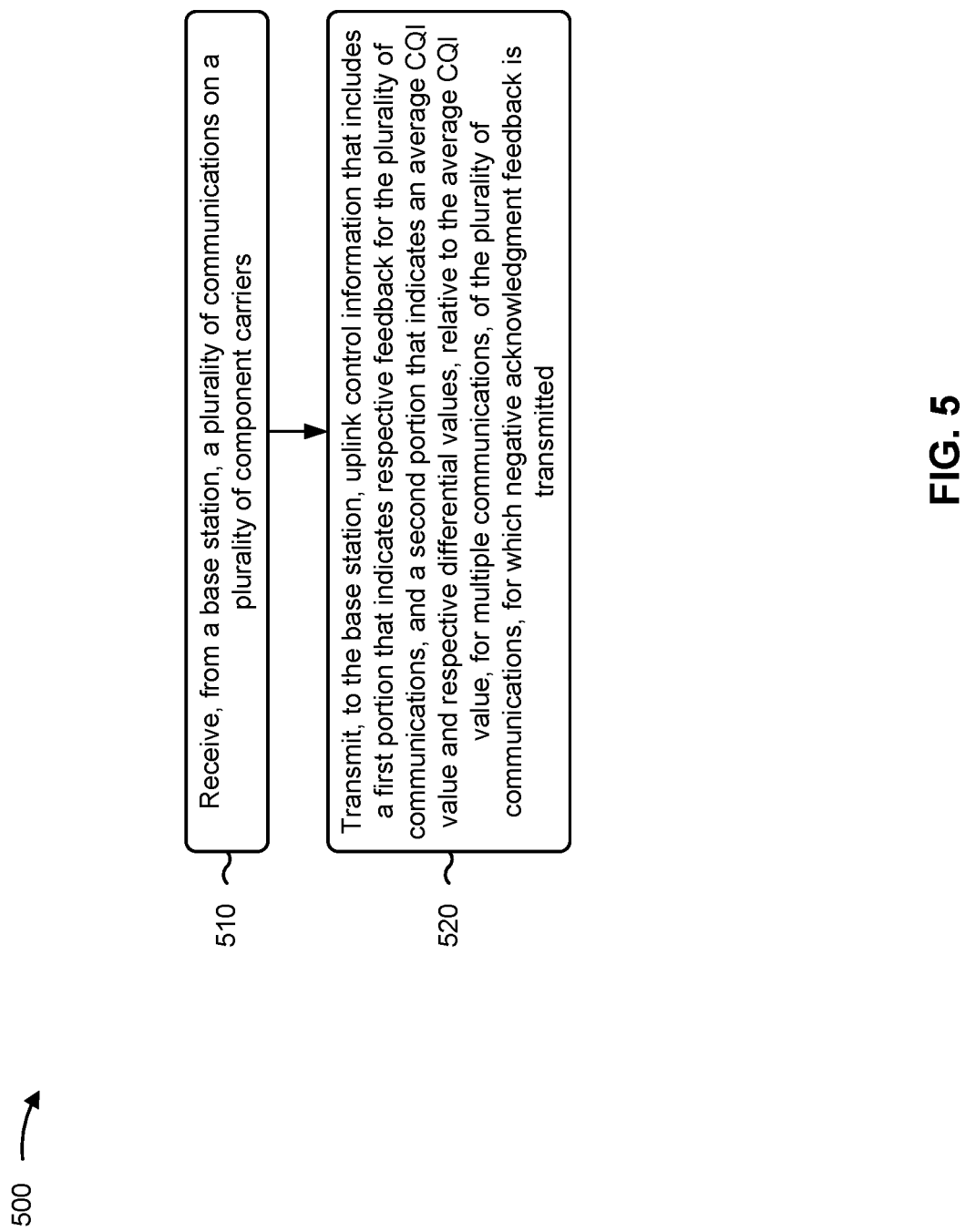
FIGS. 5 and 6 are diagrams illustrating examples associated with optimization of CQI feedback for multiple component carriers, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with optimization of CQI feedback for multiple component carriers.

As shown in FIG. 5, in some aspects, process 500 may include receiving, from a base station, a plurality of communications on a plurality of component carriers (block 510). For example, the UE (e.g., using antenna 252, DEMOD 254, MIMO detector 256, receive processor 258, controller/processor 280, and/or the like) may receive, from a base station, a plurality of communications on a plurality of component carriers, as described above.

As further shown in FIG. 5, in some aspects, process 500 may include transmitting, to the base station, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted (block 520). For example, the UE (e.g., using controller/processor 280, transmit processor 264, TX MIMO processor 266, MOD 254, antenna 252, and/or the like) may transmit, to the base station, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is transmitted, as described above.

Process 500 may include additional aspects, such as any single aspect or any combination of aspects described below and/or in connection with one or more other processes described elsewhere herein.

In a first aspect, the average CQI value is indicated using a first quantity of bits, and a differential value, of the respective differential values, is indicated using a second quantity of bits that is less than the first quantity of bits.

In a second aspect, alone or in combination with the first aspect, a differential value, of the respective differential values, is indicated using a differential value indicator that maps to an offset value that is to be applied to the average CQI value.

In a third aspect, alone or in combination with one or more of the first and second aspects, process 500 includes receiving an indication of a quantity of bits that is to be used for indicating a differential value of the respective differential values.

In a fourth aspect, alone or in combination with one or more of the first through third aspects, the indication is received via radio resource control signaling, a medium access control element, or downlink control information.

In a fifth aspect, alone or in combination with one or more of the first through fourth aspects, process 500 includes receiving information that identifies a different quantity of bits, than an indicated quantity of bits, that is to be used to indicate a differential value of the respective differential values.

In a sixth aspect, alone or in combination with one or more of the first through fifth aspects, process 500 includes determining that a different quantity of bits, than an indicated quantity of bits, is to be used to indicate a differential value of the respective differential values.

In a seventh aspect, alone or in combination with one or more of the first through sixth aspects, determining that the different quantity of bits is to be used is based at least in part on a quantity of the multiple communications.

In an eighth aspect, alone or in combination with one or more of the first through seventh aspects, feedback for a communication, of the plurality of communications, is indicated using an indicator that also indicates a bit of the average CQI value.

In a ninth aspect, alone or in combination with one or more of the first through eighth aspects, process 500 includes receiving retransmissions of the multiple communications on component carriers, of the plurality of component carriers, on which the multiple communications are received, based at least in part on transmitting the uplink control information.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
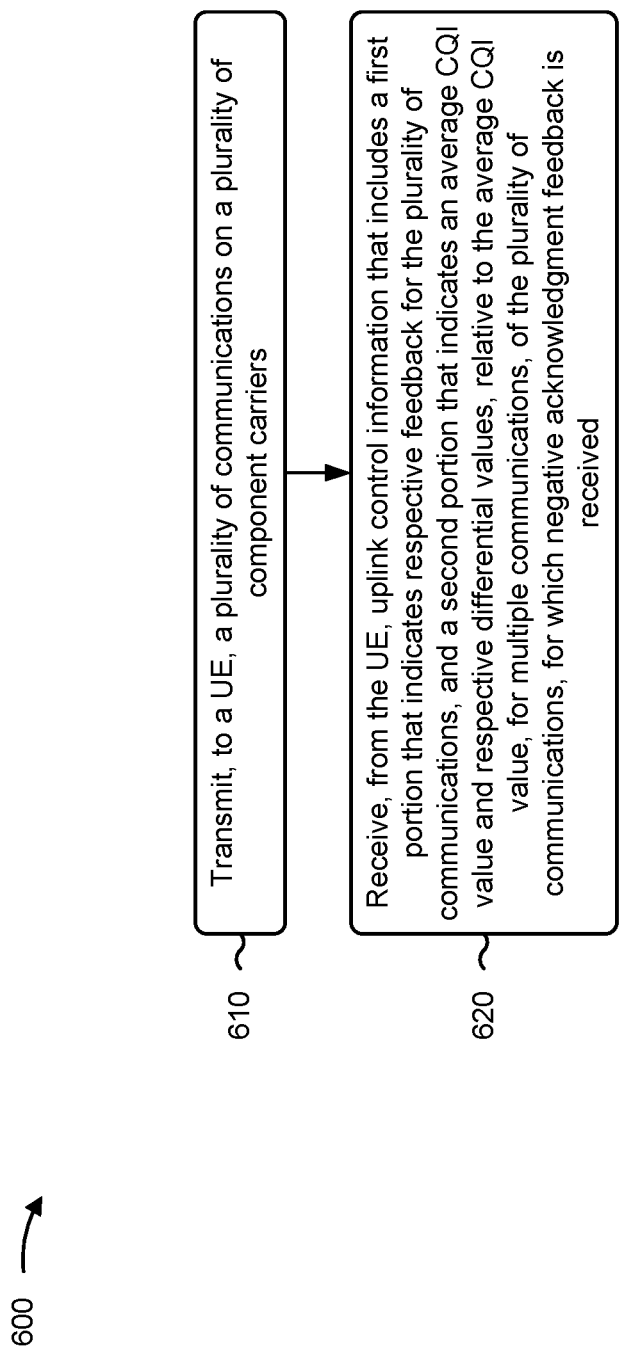

FIG. 6 is a diagram illustrating an example process 600 performed, for example, by a base station, in accordance with the present disclosure. Example process 600 is an example where the base station (e.g., base station 110 and/or the like) performs operations associated with optimization of CQI feedback for multiple component carriers.

As shown in FIG. 6, in some aspects, process 600 may include transmitting, to a UE, a plurality of communications on a plurality of component carriers (block 610). For example, the base station ((e.g., using controller/processor 240, transmit processor 220, TX MIMO processor 230, MOD 232, antenna 234, and/or the like) may transmit, to a UE, a plurality of communications on a plurality of component carriers, as described above.

As further shown in FIG. 6, in some aspects, process 600 may include receiving, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received (block 620). For example, the base station (e.g., using antenna 234, DEMOD 232, MIMO detector 236, receive processor 238, controller/processor 240, and/or the like) may receive, from the UE, uplink control information that includes a first portion that indicates respective feedback for the plurality of communications, and a second portion that indicates an average CQI value and respective differential values, relative to the average CQI value, for multiple communications, of the plurality of communications, for which negative acknowledgment feedback is received, as described above.

Process 600 may include additional aspects, such as any single aspect or any combination of aspects described below and/or in connection with one or more other processes described elsewhere herein.

In a first aspect, the average CQI value is indicated using a first quantity of bits, and a differential value, of the respective differential values, is indicated using a second quantity of bits that is less than the first quantity of bits.

In a second aspect, alone or in combination with the first aspect, a differential value, of the respective differential values, is indicated using a differential value indicator that maps to an offset value that is to be applied to the average CQI value.

In a third aspect, alone or in combination with one or more of the first and second aspects, process 600 includes transmitting an indication of a quantity of bits that is to be used for indicating a differential value of the respective differential values.

In a fourth aspect, alone or in combination with one or more of the first through third aspects, the indication is transmitted via radio resource control signaling, a medium access control element, or downlink control information.

In a fifth aspect, alone or in combination with one or more of the first through fourth aspects, process 600 includes transmitting information that identifies a different quantity of bits, than an indicated quantity of bits, that is to be used to indicate a differential value of the respective differential values.

In a sixth aspect, alone or in combination with one or more of the first through fifth aspects, the different quantity of bits that is to be used to indicate the differential value is based at least in part on a quantity of the multiple communications.

In a seventh aspect, alone or in combination with one or more of the first through sixth aspects, feedback for a communication, of the plurality of communications, is indicated using an indicator that also indicates a bit of the average CQI value.

In an eighth aspect, alone or in combination with one or more of the first through seventh aspects, process 600 includes determining, based at least in part on the average CQI value and the respective differential values, respective transmission parameters for component carriers, of the plurality of component carriers, on which the multiple communications are transmitted; and transmitting retransmissions of the multiple communications on the component carriers using the respective transmission parameters.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving, from a base station, a plurality of communications on a plurality of component carriers; and transmitting, to the base station, uplink control information that includes a first portion that indicates respective feedback for the plurality of communications, and a second portion that indicates an average channel quality indicator (CQI) value and respective differential values, relative to the average CQI value, for multiple communications, of the plurality of communications, for which negative acknowledgment feedback is transmitted.

Aspect 2: The method of Aspect 1, wherein the average CQI value is indicated using a first quantity of bits, and a differential value, of the respective differential values, is indicated using a second quantity of bits that is less than the first quantity of bits.

Aspect 3: The method of any of Aspects 1-2, wherein a differential value, of the respective differential values, is indicated using a differential value indicator that maps to an offset value that is to be applied to the average CQI value.

Aspect 4: The method of any of Aspects 1-3, further comprising: receiving an indication of a quantity of bits that is to be used for indicating a differential value of the respective differential values.

Aspect 5: The method of Aspect 4, wherein the indication is received via radio resource control signaling, a medium access control element, or downlink control information.

Aspect 6: The method of any of Aspects 1-5, further comprising: receiving information that identifies a different quantity of bits, than an indicated quantity of bits, that is to be used to indicate a differential value of the respective differential values.

Aspect 7: The method of any of Aspects 1-6, further comprising: determining that a different quantity of bits, than an indicated quantity of bits, is to be used to indicate a differential value of the respective differential values.

Aspect 8: The method of Aspect 7, wherein determining that the different quantity of bits is to be used is based at least in part on a quantity of the multiple communications.

Aspect 9: The method of any of Aspects 1-8, wherein feedback for a communication, of the plurality of communications, is indicated using an indicator that also indicates a bit of the average CQI value.

Aspect 10: The method of any of Aspects 1-9, further comprising: receiving retransmissions of the multiple communications on component carriers, of the plurality of component carriers, on which the multiple communications are received, based at least in part on transmitting the uplink control information.

Aspect 11: A method of wireless communication performed by a base station, comprising: transmitting, to a user equipment (UE), a plurality of communications on a plurality of component carriers; and receiving, from the UE, uplink control information that includes a first portion that indicates respective feedback for the plurality of communications, and a second portion that indicates an average channel quality indicator (CQI) value and respective differential values, relative to the average CQI value, for multiple communications, of the plurality of communications, for which negative acknowledgment feedback is received.

Aspect 12: The method of Aspect 11, wherein the average CQI value is indicated using a first quantity of bits, and a differential value, of the respective differential values, is indicated using a second quantity of bits that is less than the first quantity of bits.

Aspect 13: The method of any of Aspects 11-12, wherein a differential value, of the respective differential values, is indicated using a differential value indicator that maps to an offset value that is to be applied to the average CQI value.

Aspect 14: The method of any of Aspects 11-13, further comprising: transmitting an indication of a quantity of bits that is to be used for indicating a differential value of the respective differential values.

Aspect 15: The method of Aspect 14, wherein the indication is transmitted via radio resource control signaling, a medium access control element, or downlink control information.

Aspect 16: The method of any of Aspects 11-15, further comprising: transmitting information that identifies a different quantity of bits, than an indicated quantity of bits, that is to be used to indicate a differential value of the respective differential values.

Aspect 17: The method of Aspect 16, wherein the different quantity of bits that is to be used to indicate the differential value is based at least in part on a quantity of the multiple communications.

Aspect 18: The method of any of Aspects 11-17, wherein feedback for a communication, of the plurality of communications, is indicated using an indicator that also indicates a bit of the average CQI value.

Aspect 19: The method of any of Aspects 11-18, further comprising: determining, based at least in part on the average CQI value and the respective differential values, respective transmission parameters for component carriers, of the plurality of component carriers, on which the multiple communications are transmitted; and transmitting retransmissions of the multiple communications on the component carriers using the respective transmission parameters.

Aspect 20: An apparatus for wireless communication at a device, comprising a processor; memory coupled with the processor; and instructions stored in the memory and executable by the processor to cause the apparatus to perform the method of one or more of Aspects 1-10.

Aspect 21: A device for wireless communication, comprising a memory and one or more processors coupled to the memory, the one or more processors configured to perform the method of one or more of Aspects 1-10.

Aspect 22: An apparatus for wireless communication, comprising at least one means for performing the method of one or more of Aspects 1-10.

Aspect 23: A non-transitory computer-readable medium storing code for wireless communication, the code comprising instructions executable by a processor to perform the method of one or more of Aspects 1-10.

Aspect 24: A non-transitory computer-readable medium storing a set of instructions for wireless communication, the set of instructions comprising one or more instructions that, when executed by one or more processors of a device, cause the device to perform the method of one or more of Aspects 1-10.

Aspect 25: An apparatus for wireless communication at a device, comprising a processor; memory coupled with the processor; and instructions stored in the memory and executable by the processor to cause the apparatus to perform the method of one or more of Aspects 11-19.

Aspect 26: A device for wireless communication, comprising a memory and one or more processors coupled to the memory, the one or more processors configured to perform the method of one or more of Aspects 11-19.

Aspect 27: An apparatus for wireless communication, comprising at least one means for performing the method of one or more of Aspects 11-19.

Aspect 28: A non-transitory computer-readable medium storing code for wireless communication, the code comprising instructions executable by a processor to perform the method of one or more of Aspects 11-19.

Aspect 29: A non-transitory computer-readable medium storing a set of instructions for wireless communication, the set of instructions comprising one or more instructions that, when executed by one or more processors of a device, cause the device to perform the method of one or more of Aspects 11-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, from a base station, a plurality of communications on a plurality of component carriers; and
transmit, to the base station, uplink control information that includes a first portion that indicates respective feedback for the plurality of communications, and a second portion that indicates:
at least one of an average channel quality indicator (CQI) value or an average modulation coding scheme (MCS) value for failed component carriers, of the plurality of component carriers, on which multiple communications, of the plurality of communications, failed, and
respective differential values, relative to the at least one of the average CQI value or the average MCS value, for the failed component carriers.

2. The UE of claim 1, wherein the at least one of the average CQI value or the average MCS value is indicated using a first quantity of bits, and a differential value, of the respective differential values, is indicated using a second quantity of bits that is less than the first quantity of bits.

3. The UE of claim 1, wherein a differential value, of the respective differential values, is indicated using a differential value indicator that maps to an offset value that is to be applied to the at least one of the average CQI value or the average MCS value.

4. The UE of claim 1, wherein the one or more processors are further configured to:
receive an indication of a quantity of bits that is to be used for indicating a differential value of the respective differential values.

5. The UE of claim 4, wherein the indication is received via radio resource control signaling, a medium access control control element, or downlink control information.

6. The UE of claim 1, wherein the one or more processors are further configured to:
receive information that identifies a different quantity of bits, than a quantity of bits configured for indicating CQI, that is to be used to indicate a differential value of the respective differential values.

7. The UE of claim 1, wherein the one or more processors are further configured to:
determine that a different quantity of bits, than a quantity of bits configured for indicating CQI, is to be used to indicate a differential value of the respective differential values.

8. The UE of claim 7, wherein determining that the different quantity of bits is to be used is based at least in part on a quantity of the multiple communications.

9. The UE of claim 1, wherein feedback for a communication, of the plurality of communications, is indicated using an indicator that also indicates a bit of the at least one of the average CQI value or the average MCS value.

10. The UE of claim 1, wherein the one or more processors are further configured to:
receive retransmissions of the multiple communications on the failed component carriers based at least in part on transmitting the uplink control information.

11. A base station for wireless communication, comprising:
one or more memories; and
one or more processors, coupled to the one or more memories, configured to:
transmit, for a user equipment (UE), a plurality of communications on a plurality of component carriers; and
receive uplink control information that includes a first portion that indicates respective feedback for the plurality of communications, and a second portion that indicates:
at least one of an average channel quality indicator (CQI) value or an average modulation coding scheme (MCS) value for failed component carriers, of the plurality of component carriers, on which multiple communications, of the plurality of communications, failed, and
respective differential values, relative to the at least one of the average CQI value or the average MCS value, for the failed component carriers.

12. The base station of claim 11, wherein the at least one of the average CQI value or the average MCS value is indicated using a first quantity of bits, and a differential value, of the respective differential values, is indicated using a second quantity of bits that is less than the first quantity of bits.

13. The base station of claim 11, wherein a differential value, of the respective differential values, is indicated using a differential value indicator that maps to an offset value that is to be applied to the at least one of the average CQI value or the average MCS value.

14. The base station of claim 11, wherein the one or more processors are further configured to:
transmit an indication of a quantity of bits that is to be used for indicating a differential value of the respective differential values.

15. The base station of claim 14, wherein the indication is transmitted via radio resource control signaling, a medium access control control element, or downlink control information.

16. The base station of claim 11, wherein the one or more processors are further configured to:
transmit information that identifies a different quantity of bits, than a quantity of bits configured for indicating CQI, that is to be used to indicate a differential value of the respective differential values.

17. The base station of claim 16, wherein the different quantity of bits that is to be used to indicate the differential value is based at least in part on a quantity of the multiple communications.

18. The base station of claim 11, wherein feedback for a communication, of the plurality of communications, is indicated using an indicator that also indicates a bit of the at least one of the average CQI value or the average MCS value.

19. The base station of claim 11, wherein the one or more processors are further configured to:
transmit retransmissions of the multiple communications on the failed component carriers using respective transmission parameters for the failed component carriers based at least in part on the at least one of the average CQI value or the average MCS value and the respective differential values.

20. A method of wireless communication performed by a user equipment (UE), comprising:
  receiving, from a base station, a plurality of communications on a plurality of component carriers; and
  transmitting, to the base station, uplink control information that includes a first portion that indicates respective feedback for the plurality of communications, and a second portion that indicates:
    at least one of an average channel quality indicator (CQI) value or an average modulation coding scheme (MCS) value for failed component carriers, of the plurality of component carriers, on which multiple communications, of the plurality of communications, failed, and
    respective differential values, relative to the at least one of the average CQI value or the average MCS value, for the failed component carriers.

21. The method of claim 20, wherein the at least one of the average CQI value or the average MCS value is indicated using a first quantity of bits, and a differential value, of the respective differential values, is indicated using a second quantity of bits that is less than the first quantity of bits.

22. The method of claim 20, further comprising:
  receiving an indication of a quantity of bits that is to be used for indicating a differential value of the respective differential values.

23. The method of claim 20, further comprising:
  receiving information that identifies a different quantity of bits, than a quantity of bits configured for indicating CQI, that is to be used to indicate a differential value of the respective differential values.

24. The method of claim 20, wherein feedback for a communication, of the plurality of communications, is indicated using an indicator that also indicates a bit of the at least one of the average CQI value or the average MCS value.

25. The method of claim 20, further comprising:
  receiving retransmissions of the multiple communications on the failed component carriers based at least in part on transmitting the uplink control information.

26. A method of wireless communication performed by a base station, comprising:
  transmitting, for a user equipment (UE), a plurality of communications on a plurality of component carriers; and
  receiving uplink control information that includes a first portion that indicates respective feedback for the plurality of communications, and a second portion that indicates:
    at least one of an average channel quality indicator (CQI) value or an average modulation coding scheme (MCS) value for failed component carriers, of the plurality of component carriers, on which multiple communications, of the plurality of communications, failed, and
    respective differential values, relative to the at least one of the average CQI value or the average MCS value, for the failed component carriers.

27. The method of claim 26, wherein the at least one of the average CQI value or the average MCS value is indicated using a first quantity of bits, and a differential value, of the respective differential values, is indicated using a second quantity of bits that is less than the first quantity of bits.

28. The method of claim 26, further comprising:
  transmitting an indication of a quantity of bits that is to be used for indicating a differential value of the respective differential values.

29. The method of claim 26, further comprising:
  transmitting information that identifies a different quantity of bits, than a quantity of bits configured for indicating CQI, that is to be used to indicate a differential value of the respective differential values.

30. The method of claim 26, further comprising:
  transmitting retransmissions of the multiple communications on the failed component carriers using respective transmission parameters for the failed component carriers based at least in part on the at least one of the average CQI value or the average MCS value and the respective differential values.

* * * * *